United States Patent [19]
Kass

[11] Patent Number: 6,021,180
[45] Date of Patent: Feb. 1, 2000

[54] PROCESSING OF TELECOMMUNICATIONS TRANSMISSIONS AND DIRECTING CONSUMERS TO NEED PROVIDERS

[75] Inventor: Sheldon Kass, North Brunswick, N.J.

[73] Assignee: The Business Edge Group, Inc., North Brunswick, N.J.

[21] Appl. No.: 08/846,414

[22] Filed: Apr. 30, 1997

[51] Int. Cl.⁷ .................................................. H04M 11/00
[52] U.S. Cl. ...................... 379/88.01; 379/211; 379/220; 379/229; 379/88.19
[58] Field of Search .............................. 379/88.01, 88.02, 379/88.19, 88.2, 88.22, 201, 216, 219, 220, 221, 229, 230, 210, 211; 707/4

[56] References Cited

U.S. PATENT DOCUMENTS

| | | | |
|---|---|---|---|
| 4,608,460 | 8/1986 | Carter et al. ............................ | 179/6.11 |
| 4,677,659 | 6/1987 | Dargan ...................................... | 379/97 |
| 4,757,267 | 7/1988 | Riskin ...................................... | 379/113 |
| 4,827,500 | 5/1989 | Binkerd et al. ....................... | 379/88.01 |
| 4,839,919 | 6/1989 | Borges et al. ............................ | 379/96 |
| 4,979,206 | 12/1990 | Padden et al. .......................... | 379/213 |
| 5,031,206 | 7/1991 | Riskin .................................. | 379/88.15 |
| 5,052,038 | 9/1991 | Shephard .................................. | 379/88 |
| 5,418,948 | 5/1995 | Turtle ...................................... | 395/600 |
| 5,483,586 | 1/1996 | Sussman ................................ | 379/201 |
| 5,506,897 | 4/1996 | Moore et al. ............................ | 379/220 |
| 5,553,119 | 9/1996 | McAllister et al. ...................... | 379/207 |
| 5,588,048 | 12/1996 | Neville .................................... | 379/201 |
| 5,592,538 | 1/1997 | Kosowsky et al. ...................... | 379/355 |
| 5,638,425 | 6/1997 | Meador, III et al. ................... | 379/201 |
| 5,703,935 | 12/1997 | Raissyan et al. ........................ | 379/211 |
| 5,752,243 | 5/1998 | Reiter et al. ................................ | 707/3 |
| 5,764,731 | 6/1998 | Yablon .................................... | 379/213 |
| 5,787,159 | 7/1998 | Hamilton et al. ........................ | 379/201 |
| 5,805,688 | 9/1998 | Gillespie et al. ........................ | 379/220 |
| 5,873,056 | 2/1999 | Liddy et al. ................................ | 707/3 |

OTHER PUBLICATIONS

TAD–252 Telephone Answering System Owner's Manual, Cat. No. 43–395 DuoFone, 1987.
OCTEL User Reference Manual, OCTEL Communications Corporation, Nov. 1994.

*Primary Examiner*—Daniel S. Hunter
*Attorney, Agent, or Firm*—Cooley Godward LLP

[57] ABSTRACT

A processor responds to first and second specific sequences of data by providing the same first expression. The first and second specific sequences of data are derived from sequences of telephone digits which are typed in by a telephone caller. The first expression is transmitted by the processor back to the telephone caller in a spoken language. The processor first receives a general sequence of data before responding to either the first specific sequence of data or the second specific sequence of data. The processor receives the actual locations of a plurality of telephones in a region. The processor uses these actual locations to produce a first estimated location of a telephone in the region. Distances of the actual locations of the plurality of telephones in the region from the first estimated location are calculated by the processor. The processor then preferably eliminates telephones that are located above a threshold distance from the first estimated location. A revised estimated location is then calculated based on the actual locations of the plurality of telephones in the region with the exception of the eliminated telephones. The processor receives locations of a plurality of providers and determines a first provider that is nearby to a telephone caller. In response to a telephone call from the telephone caller, the processor places the telephone caller in communication with the first provider.

38 Claims, 9 Drawing Sheets

FIG. 7A

VOICE BUCKET
STARTS OFF EMPTY

FIG. 7B  FIRST PERSON LEAVES
A MESSAGE

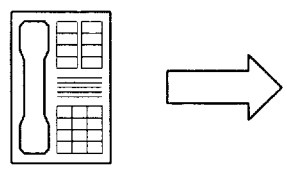 ⇒ 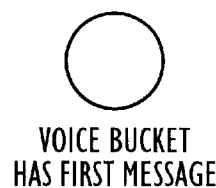

VOICE BUCKET
HAS FIRST MESSAGE

FIG. 7C  SECOND PERSON
LISTENS TO A MESSAGE

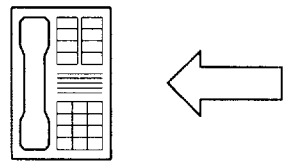 ⇐ 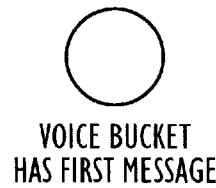

VOICE BUCKET
HAS FIRST MESSAGE

FIG. 7D  THEN SECOND PERSON
LEAVES A NEW MESSAGE

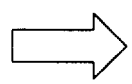 ⇒ 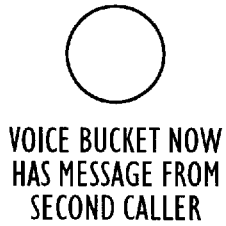

VOICE BUCKET NOW
HAS MESSAGE FROM
SECOND CALLER

FIG. 7E  FIRST PERSON HEARS
MESSAGE LEFT BY
SECOND CALLER

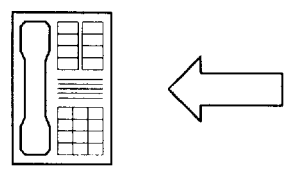 ⇐ 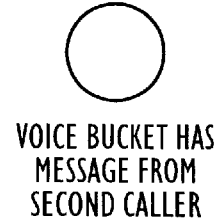

VOICE BUCKET HAS
MESSAGE FROM
SECOND CALLER

PROCESSING OF TELECOMMUNICATIONS TRANSMISSIONS AND DIRECTING CONSUMERS TO NEED PROVIDERS

FIELD OF THE INVENTION

This invention relates to methods and apparatus for processing telecommunications transmissions and more particularly to techniques for directing consumers to providers of products and services.

BACKGROUND OF THE INVENTION

U.S. Pat. No. 4,757,267 to Riskin, discloses a system wherein an "800" number is dialed and the "800" number itself, or an "800" number plus an extension, describes both a product and an advertiser. (See Riskin, col. 8, lns. 23; col. 15, lns. 55–66). The caller is automatically connected to a local dealer of the product from the specific advertiser. (Riskin, Col. 5, lns. 18–26; Col. 8, ln. 37–55).

Riskin estimates a caller's location to determine a "nearby" dealer by using the caller's NPA-NNX (where "NPA" is the three digit area code and "NNX" is the three digit exchange also known as a "prefix") to access the vertical and horizontal coordinates of the corresponding central office location. The coordinates of the central office are assumed to be the location of the caller. The six digit NPA-NNX code of the dealers are used to determine the dealer's location. (Riskin, col. 18, lns. 30–33).

SUMMARY OF THE INVENTION

One embodiment of the present invention is comprised of a processor which responds to first and second specific sequences of data by providing the same first expression. The two different specific sequences of data are preferably transmitted as first and second telecommunications transmissions. The first and second telecommunications transmissions may be one or more of the following: a facsimile transmission, an oral or verbal transmission, a standard telephonic transmission, or a wireless transmission. The first and second specific sequences of data are preferably derived from first and second specific sequences, respectively, of telephone digits which are typically typed in by a telephone caller. The first expression is typically transmitted by the processor back to the telephone caller and may be provided in a spoken language.

The processor typically responds to the first specific sequence of telephone digits by transmitting the first expression to the telephone caller. Similarly, the processor typically responds to the second specific sequence of telephone digits by transmitting the same first expression to the telephone caller as was transmitted in response to the first specific sequence of data. In this manner, the processor preferably interprets different sequences of telephone digits to "mean" the same thing.

In one embodiment of the present invention, the processor must first receive a general sequence of data before responding to either the first specific sequence of data or the second specific sequence of data. This general sequence of data in the case of a telephone telecommunications transmission may be a general "800" help number.

The first or second specific sequences of data or the general sequence of data may be derived from spoken language communications spoken into a telephone as opposed to a telephone caller typing keys on a telephone. In that case the processor would preferably include voice recognition software to undertand and translate the voice or spoken language communications into computer readable form. The processor may be connected to a modem through which the telecommunications transmissions are received and sent. The modem may actually be comprised of a bank of modems or actually be comprised of a telephone voice card which allows multiple telephone line input and output. "Modem" in this application is used in a broad sense as "a device to convert signals from one type of equipment into a form suitable for input to another type", such as modems for connecting a computer to the telephone system.

In another embodiment of the present invention, the processor preferably receives the actual locations of a plurality of telephones in a region. The processor uses these actual locations to produce a first estimated location of a telephone in the region. Distances of the actual locations of the plurality of telephones in the region from the first estimated location are calculated by the processor. The processor then preferably eliminates telephones that are located above a threshold distance from the first estimated location. A revised estimated location is then calculated based on the actual locations of the plurality of telephones in the region with the exception of the eliminated telephones.

In one embodiment of the present invention the processor receives locations of a plurality of need providers and determines a first provider that is nearby to a desired location. Preferably the desired location is the location of a telephone caller. The location of the telephone caller can be the first estimated or the revised estimated location as mentioned previously, or a location determined in any other manner. Preferably, the processor in response to a telephone call from the telephone caller calls a telephone of the first provider and thereby places the telephone caller in communication with the first provider. The processor also preferably determines a second provider that is nearby to the telephone caller and in response to a signal calls a telephone of the second provider and thereby places the telephone caller in communication with the second provider.

BRIEF DESCRIPTION OF THE DRAWINGS

FIG. 7 shows a flow chart for a telephone rendezvous method.

DETAILED DESCRIPTION OF THE DRAWINGS

Figure 1:
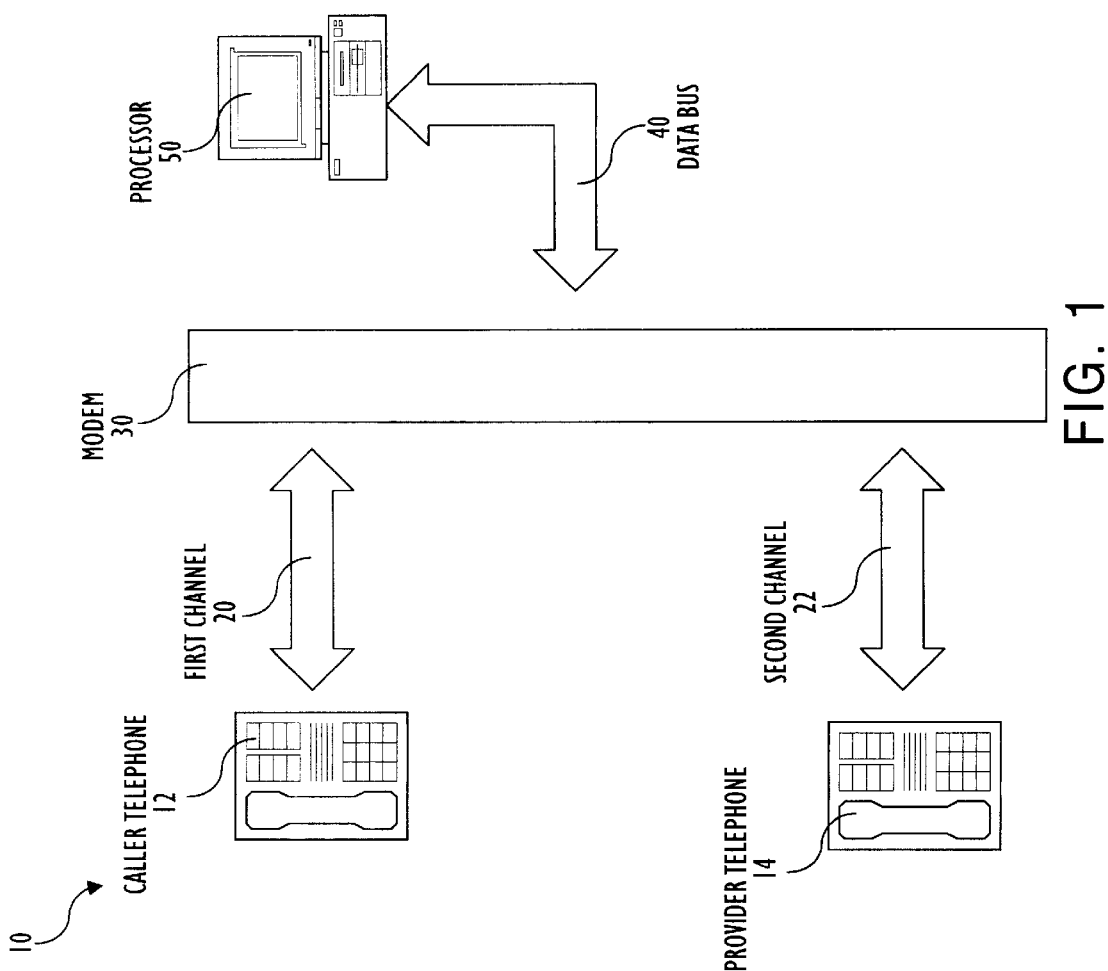
FIG. 1 illustrates a telecommunications system.

FIG. 1 shows a telecommunications system 10 comprised of a caller telephone 12, a provider telephone 14, a first telecommunications channel 20, a second telecommunications channel 22, a modem 30, a bidirectional data bus 40, and a processor 50.

The caller telephone 12 or provider telephone 14 are preferably stationary telephones but in some embodiments of the present invention cellular phones can be used for either the caller telephone 12 or the provider telephone 14. The caller telephone 12 or provider telephone 14 can also in some embodiments be replaced or augmented by another telecommunications device such as a fax machine or a computer. The first and second telecommunications channels 20 and 22 may be standard hard wired telephone cable or fiber optics, or for some embodiments such as when cellular phones are used, may be comprised of air channels. The modem 30, bidirectional data bus 40, and processor 50 may be incorporated into a single personal computer such as a Pentium 200 Pro (trademark), which may be 128 Mhz., and have an 8 GigaByte Hard Drive. Alternatively or additionally a bank of such computers may be provided.

The modem 30 is actually preferably comprised of a Dialogic (trademark) Telephone Voice Board, which can be model D240 SC-T1. This model of Telephone Voice Board can connect to 24 separate phone lines. However, for most embodiments of the present invention this means that up to twelve (12) callers can be serviced at a time, since one inbound line from a caller and one outbound line for a need provider is needed.

Figure 2A:
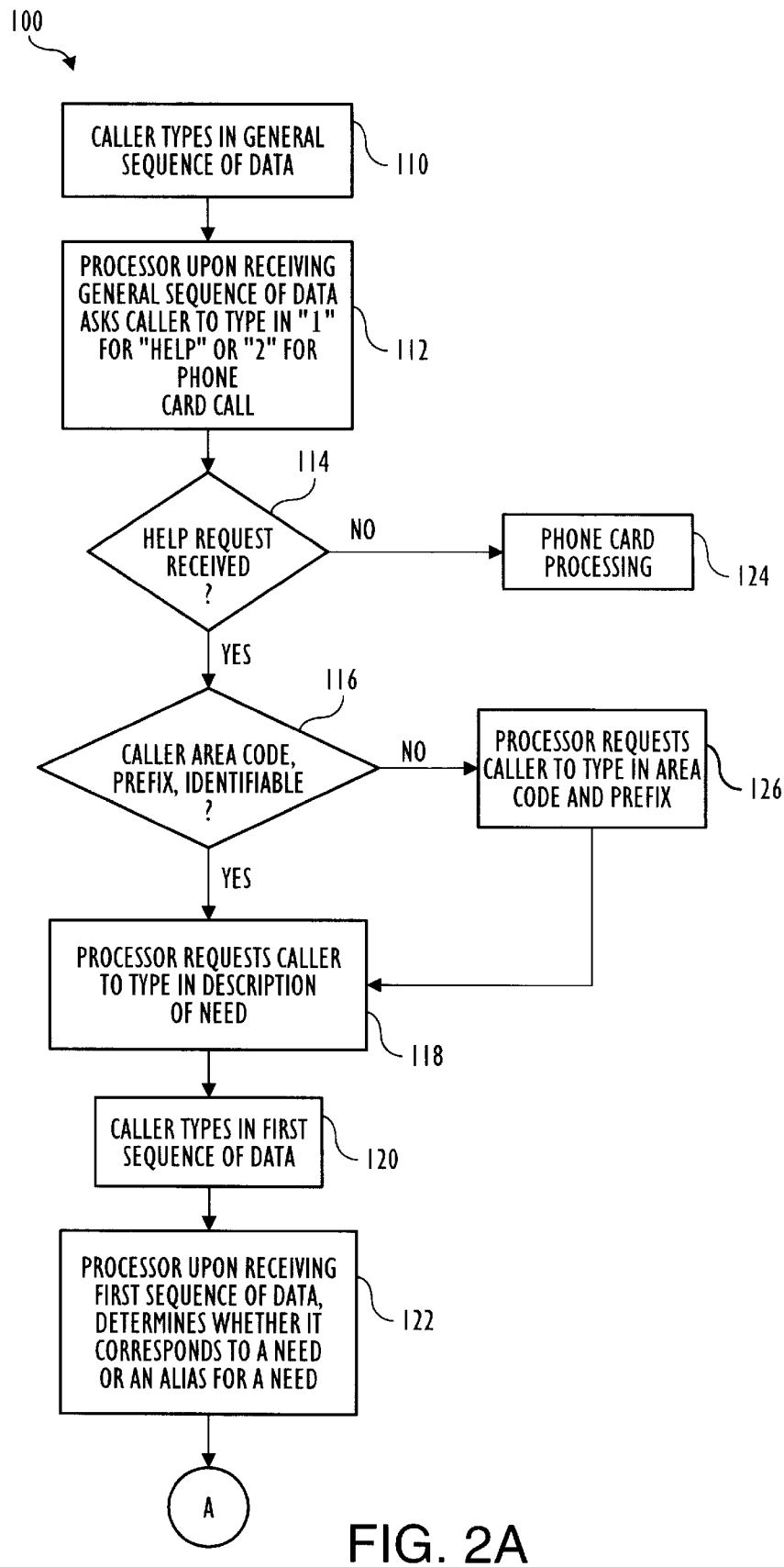
FIGS. 2A and 2B shows a flow chart of a method of operation of the telecommunications system in accordance with the present invention.
Figure 2B:
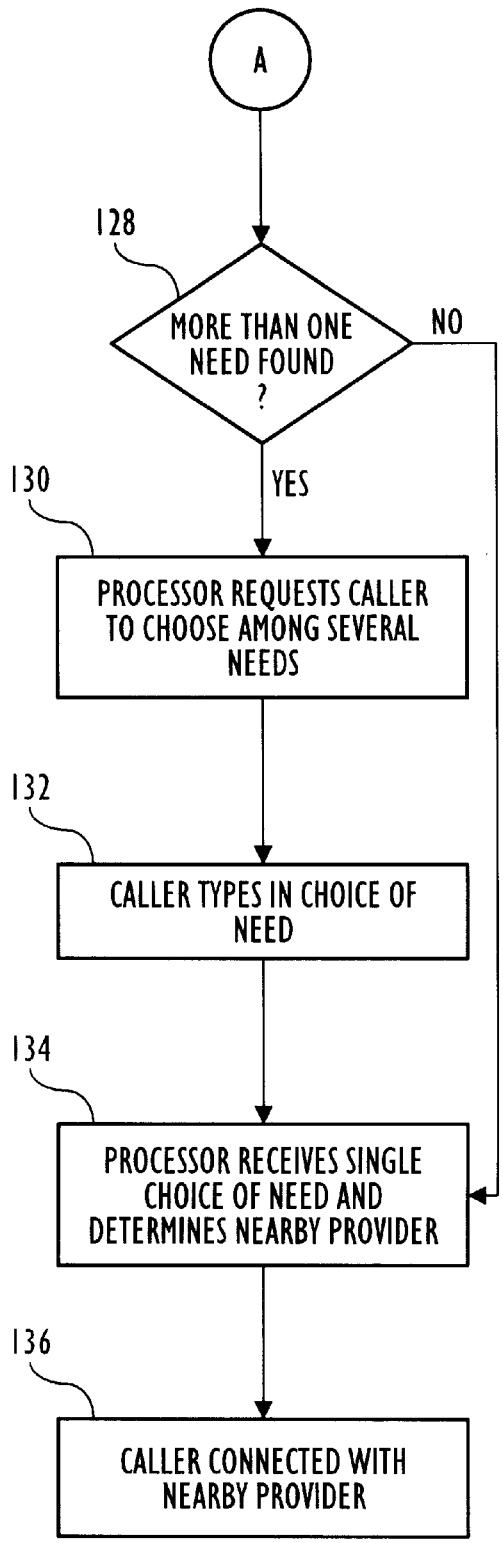

FIGS. 2A and 2B show a flow chart 100 of a method of operation of the telecommunications system 10 of FIG. 1 in accordance with an embodiment of the present invention. At step 110, a caller dials or types in a general sequence of data into the caller telephone 12 of FIG. 1. This general sequence of data is preferably a general sequence of telephone digits. For example the general sequence of data may be the phone number "1-800-443-3557" which can also be be defined as "1-800-HHEELLPP" (The last "P" has no effect, but is used only to help individuals remember it). In this example the general sequence of telephone digits can be described as a general "help" 1-800 number. Other mnemonics can be used to provide a general "help" number.

The general sequence of telephone digits, in this instance "1-800-HHEELLPP" is transmitted as a telecommunications transmission from the caller telephone 12 via the telecommunications channel 20, the modem 30, and the data bus 40 to the processor 50. At step 112 of the flow chart 100, the processor 50 upon receiving the general sequence of digits, asks the telephone caller to type in "1" for "Help" or "2" to make a Phone card call. The processor 50 makes this request by sending a telecommunications transmission to the caller telephone 12 via data bus 40, modem 30, and channel 20. This request is preferably a voice telecommunications transmission which actually states "For Help type 1 for phone card type 2". However, alternatively or additionally the request may by provided in a computer readable form to appear on a monitor or by any other means.

The caller's response is transmitted from the caller telephone 12 to the processor 50. At step 114, processor 50 determines whether a help request has been received. If a help request has been received the processor 50 next determines, at step 116 whether the location of the caller telephone 12 can be identified. The location of the caller telephone 12 is preferably determined from its full telephone number which typically yields a precise latitude and longitude of the caller telephone 12. However, if this telephone is not included on the lattitude-longitude database in processor 50, the location of caller telephone 12 can be approximated from its entire telephone number or from its six digit code for its area code and prefix (hereinafter "AAA-PPP") . If "caller I.D." or "caller identification", terms known in the art, is available, then the six digit code will automatically be determined by the processor 50. However, if "caller I.D." is not available, then the caller will be asked to type in the entire phone number or optionally the six digit code, at step 126. The caller can also be asked to preferably type in the full telephone number.

Assuming the location of the caller telephone 12 (or estimated location) can be determined, the processor 50, next asks the caller at step 118 to type in a description of the "need" the caller needs filled. The processor 50 again sends a telecommunications transmission via data bus 40, modem 30, channel 20, to caller telephone 12, and this transmission is again preferably a voice communication. The voice communication preferably also tells the caller that he/she should use the lettering on the telephone keypad to describe in language (such as preferably English) his/her "need".

At step 120 the caller types into the caller telephone 12 a first specific sequence of data which in this case is a first specific sequence of telephonic digits. These digits desribe the caller's "need". For example a caller may type in the digits "A", "U", "T", and "O", in sequence, for the word "AUTO". These letters correspond to the telephone numbers "2", "8", "8", and "6". After this sequence is typed in, the professor 50 preferably requires the caller to type a key to indicate that he is finished, such as the "*" key or the "#" key or any other convenient key or sequence of keys. This final key allows a user to type in a description of various character lengths, i.e. the description of a need may be two characters long, ten characters long or seventeen characters long.

Figure 3A:
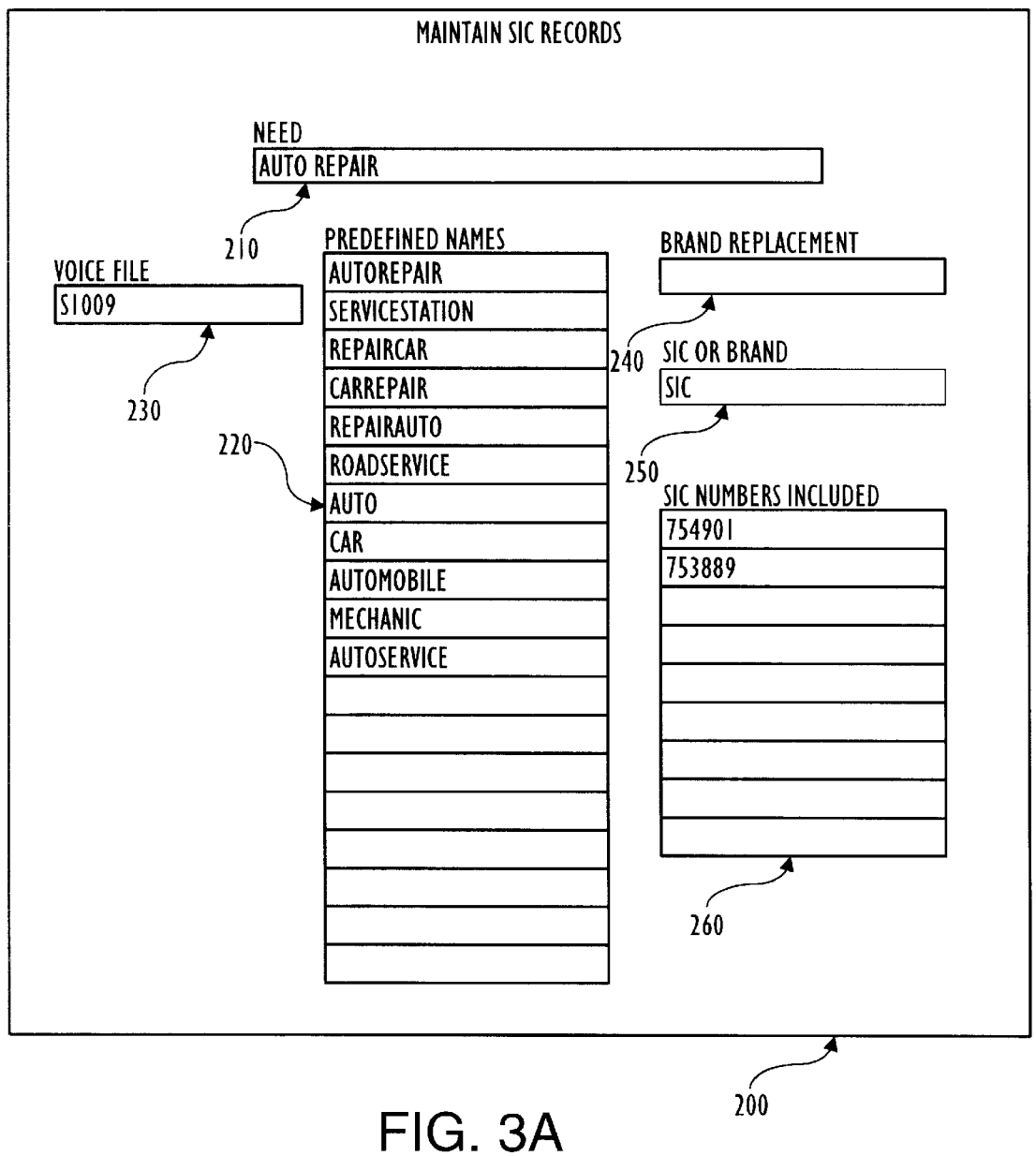
FIG. 3A shows a computer software record for the general need "Auto Repair"

The processor 50 upon receiving the first specific sequence of data at step 122, determines whether it corresponds to a known need or an alias for a need. FIG. 3A, shows a computer software record 200 for the need "Auto Repair". Shown in column 220 under the heading "predefined names" are aliases for the need "Auto Repair". As shown in FIG. 3A, the word "AUTO" is an alias for the need "AUTO REPAIR". Other aliases include "Service Station", "Repair Car", "Car Repair", "Repair Auto", etc. However, preferably the description typed in by the caller at caller telephone 12 does not have spaces between words, since spaces on a telephone are typically not possible, i.e. the caller actually types in "REPAIRAUTO". Under column 210, under the heading "need" in FIG. 3A is the main descriptiive name for the need. Under column 230 under the heading "voice file" is the name of the software voice file stored in the processor 50 which can be accessed to actually state the phrase "Auto Repair" in a spoken language voice communication. In this instance the voice file is "S1009". In Column 240, under the heading "BRAND replacement", a blank is shown because "Auto Repair" is a general need and therefore brand replacement is not applicable. Under Column 250, under the heading "SIC or BRAND", the word "SIC" appears, indicating that the need "Auto Repair" has a SIC code and is not a brand name. Since "Auto Repair" is a general need, it has a SIC code. "SIC", as known, means Standard Industrial Classification (SIC) coding system. Column 260, which has a heading "SIC numbers included" indicates all SIC codes that apply to this general need. For "Auto Repair" there are two SIC codes "754901" and "753899".

Figure 3B:
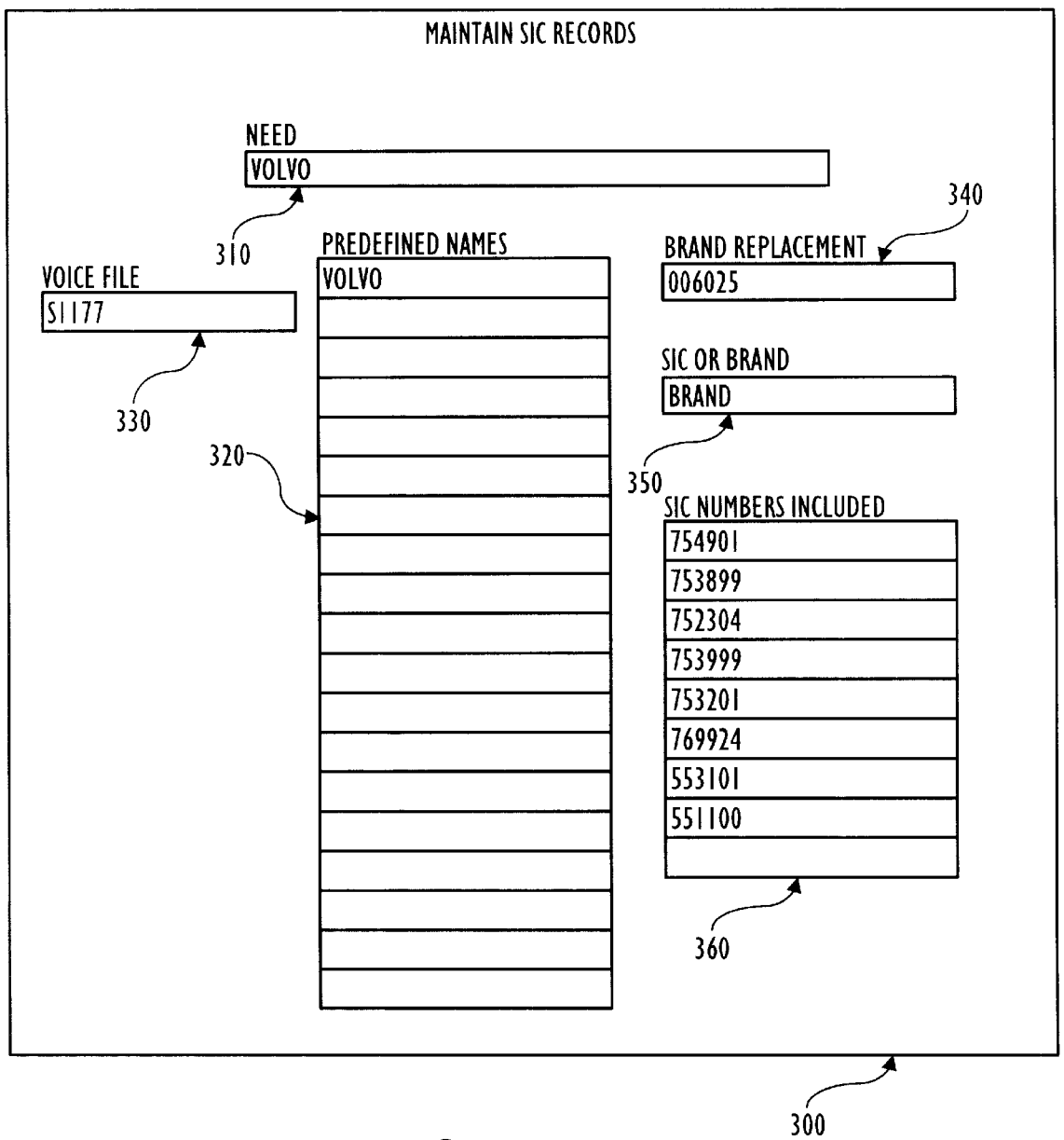
FIG. 3B shows a computer software record for the brand name need "Volvo"

FIG. 3B shows a brand name need record 300 similar to the general need record 200. The brand name need record 300 has a column 310 with heading "need" under which the name for the brand "VOLVO" is shown. The record 300 has a column 320 with a heading "predefined names" under which the alias "VOLVO" is shown. Note that typically for a brand name there is only one alias and it is the same as the brand name. However, a brand may also have an alias such as for example "Volkswagen" may have an alias of "VW". The column 330 specifies a heading "voice file" under which the voice file "S1177" is shown. The column 340 specifies a brand replacement. The "brand replacement" is a code that relates to each brand. Each business, or general need, is identified by a collection of government specified SIC codes. For example, "Auto Repair" has SIC codes "754901" and "753899" as shown in FIG. 3A, column 260. The process of tagging a business or "general need" to a Brand or "brand replacement" code is handled by the introduction of the "brand replacement" codes. Essentially, each brand need provider that is included as belonging to a brand is repeated in the system with a separate brand record, such as the record 300 in FIG. 3B. The "brand replacement" codes do not conflict with the SIC codes in that the "brand replacement" codes have two leading zeros. "Brand replacement" code 006025 is shown in column 340 in FIG. 3B. This "brand replacement" code is placed in the SIC code field.

The column 350 specifies SIC or BRAND and in this case we have a brand name. THe column 360 specifies the SIC numbers included for this brand. The BRAND database, which is comprised of a plurality of records, such as record 300 shown in FIG. 3B, and which is located in processor 50, is preferably obtained by examining each member or need provide of each SIC code for the includsion of the brand name.

If the description typed in by the caller at caller telephone 12 is not understood by the processor 50 then the processor 50 will request preferably by a voice telecommunications transmission, that the caller enter another description for his "need".

"Table A" shows a sample list of general needs that may be available to be accessed. "Table B" shows a sample list of brand name needs that may be available to be accessed.

If the first specific sequence of data makes out the word "AUTO" then many different needs satisfy that sequence of data. This is because "AUTO" is listed as an alias (or predefined name) in many records of many different general needs. For example the term "AUTO" may mean "AUTO REPAIR", "AUTO BODY SHOP", "AUTO ENGINE REPAIR", "CAR RENTAL", and "CAR WASH" and many other needs shown in the "Table A" of General Needs. Note that each one of the needs shown in "Table A" has a software record analogous to the software record 200 for the need "Auto Repair" shown in FIG. 3A. In addition each one of the brand name needs in "Table B" has a software record analogous to the software record 300 for the need "VOLVO" shown in FIG. 3B.

TABLE A

Sample List of General Needs

| Accounting Services | Car Wash | Massage |
| Amusement Parks | Dentist | Movie Theater |
| Auto Body Shop | Eye Glass Store | Optometrist |
| Bicycle Rental | Furniture Repair | Post Office |
| Book Store | Lawyer | Taxi |

TABLE B

Sample List of Brand Needs

| Acura | Exxon | Merrill Lynch |
| Amoco | Harley Davidson | Nissan |
| BMW | Hertz | Roto Rooter |
| Burger King | Jaguar | State Farm |
| Cadillac | Lexus | U Haul |

If at step 128 in FIG. 2B, the processor 50 finds more than one need corresponding to the description typed in by the caller at caller telephone 12, then at step 130 the processor 50 requests the caller to choose among several different needs. Typically, the processor 50 will provide a voice telecommunications transmission via the data bus 40, modem 30, and channel 20 to the caller telephone 12 stating for example the following in the case where "AUTO" was first typed in: "Your description corresponds to more than one need please for AUTO REPAIR type 1, for CAR RENTAL type 2, for CAR WASH, type 3 . . ." The caller then typically types in a number into caller telephone 12, for his choice of need at step 132. The processor 50 receives the choice at step 134 and determines a nearby provider of the need.

The processor 50 preferably determines twenty nearby providers and allows the caller to call the next provider by hitting a key such as the "#" on the telephone. The twenty nearby providers are ordered by the processor 50 by their distance from the caller telephone 12. This means a first nearby provider will be provided to the caller and then the caller may go on to a second or a third. The revised estimated location of the caller telephone 12 preferably serves as the origin for the service provider search.

The processor 50 would then place a telephone call to a nearby provider, which is shown in FIG. 1 as provider telephone 14. The processor 50 may first request the user to type a key such as the "#" key before the call is placed to a nearby provider of the need. Preferably the nearby provider is the closest provider. Then, at step 136 of FIG. 2B, the processor 50 would connect the caller telephone 12 with the provider telephone 14 so that the caller could communicate directly with the provider.

If there is a busy signal on the provider telephone 14, the processor 50 may automatically connect the caller telephone 12 to the next nearby provider. Alternatively or additionally, the caller may be able to call the next nearby provider by hitting the "#" key.

Information concerning the call, such as identification of the location of the caller telephone 12, the location of the provider telephone 14 which was called, the identity of the provider, and the length of the telephone call is preferably stored for auditing purposes.

The processor 50 as described, has the capability of interpreting a plurality of sequences of data as meaning the same thing. For example a first specific sequence of data comprised of the keys "2", "2", "7" or "CAR" is interpreted to be a request for the "need" "CAR REPAIR", as well as many other needs (such as "CAR RENTAL", "CAR WASH" and others shown in Table A) Similarly a second specific sequence of data comprised of the keys "2", "8", "8", "6" in sequence to indicate "AUTO", is also interpreted to be a request for the "need" "CAR REPAIR", as well as the same needs as interpreted for the sequence indicating "CAR". Thus the processor 50 provides a first expression, such as "CAR REPAIR", and a plurality of further expressions, in response to either the first specific sequence of data "CAR" or the second specific sequence of data "AUTO".

The description of the need, provided by the caller, can be an oral description or a series of telephone digits. If a series of telephone digits is used, these digits preferably form a plurality of the first letters of a spoken language word.

The needs provided may for example be products or services. Preferably needs are grouped together according to a code which may for example be a SIC code. A data base is preferably provided in memory in the processor 50, where providers that provide a first general need are grouped together in a first general need set; and the providers in the first general need set are further organized in a manner which represents each provider's geographical location. The processor 50 preferably searches the general need data base to find the closest provider or providers of a particular need and by also using data regarding telephone location such as the location of caller telephone 12. The precise latitude/longitude or the six digit code for area code and prefix are typically used to yield a position of a need provider.

The preferred method of identifying the location of caller telephone 12 in FIG. 1 is by using "caller identification" or "caller i.d." information. From the "caller i.d." information the actual complete phone number can be determined or optionally the six digit code for the caller's area code and prefix will be available. In an embodiment of the present invention, prior to the caller located at caller telephone 12 calling, a first estimate is made for each six digit area code and prefix. Each first estimate is an average latitude and longitude for all known telephone locations having the six digit area code and prefix.

A data base is stored in processor 50 which includes all telephones which have known locations in the United States. For each telephone in this data base a precise latitude and longitude is included. The first choice of determining the caller telephone 12 location is to use this known telephone data base. For each area code-prefix region, a list of latitude and longitude for identified telephones is prepared, and an average latitude and longitude calculated. This average latitude and longitude is the first estimated location also known as the average original center point.

The processor 50 would then determine the distances of all known telephones in the area code-prefix region from the first estimated location. This is preferably done prior to a caller using the service. It is preferably done in advance yielding an area code/prefix data base. The processor 50 would also determine an average distance for the known telephones in the area code-prefix region from the first estimated location. The processor 50 would then eliminate or discard any known telephones which are more than three times the average distance from the first estimated location. A revised estimated location would then be determined based on known telephone locations in the area code-prefix region with the exception of the eliminated "far away" telephones. The reason for the elimination of the extreme telephones is that when some people move to a new address, they keep their prior telephone. Sometimes they move 10, 30, 200 etc. miles. Without the elimination of these "far away" telephones, the precision of the results would be diminished.

One revised estimated location for each six digit area code-prefix combination in the United States can be calculated in advance and stored in an area code-prefix location data base in the processor 50 for access when an individual calls from caller telephone 12. Preferably the revised estimated location is comprised of latitude and longitude information. Preferably the latitude information is comprised of a number of miles north from some point and the longitude information is comprised of a number of miles east from some point. Thus, the processor 50 needs only to access the appropriate revised estimated location from its own database or data bases after the processor 50 has ascertained the area code and prefix of the caller telephone 12.

The processor 50 preferably interprets descriptions of needs so that the telephone number key "0" is converted to "6" which stands for the letter "O" and also so that the telephone number key "1" is converted to "4" which stands for the letter "I".

Preferably processor 50 includes data bases for telephone numbers and SIC codes for providers which are developed in advance (i.e. prior to a call from a telephone such as caller telephone 12).

Figure 4:
FIG. 4 shows a database of grids for searching for a nearby provider of a need.

A database comprised of a plurality of "grids" is preferably prepared by the processor 50 before a phone call is received from a caller such as from caller telephone 12. One such database 400 is shown in FIG. 4. The database 400 includes a plurality of grids such as grid 410 and grid 412. Each grid includes a location label and a SIC code label. For example, the grid 410 includes location label "N00407 E01603" indicating a location 407 miles north and 1603 miles East of an origin. These "mile" coordinates were obtained by the processor 50 by converting from latitude and longitude to "miles" using spherical trigonometry. The origin is preferably the place on the earth that is at zero latitude and zero longitude. Zero latitude is on the equator. Zero longitude is at Greenwich England. It is the same longitude that is called the International Date Line. Longitude is measured positive going East and negative going West. All points in the United States are therefore of negative longitude. In order to work with positive numbers, the processor 50, in one embodiment of the present invention adds 360 degrees to each longitude point.

The grid 410 also includes a SIC code label indicating the SIC code "751400". All the grids in the database 400 shown in FIG. 4 have a SIC code of "751400". Each grid in the database 400 includes a list of need providers (also called service providers, although products as well as services can be provided). When a call is received from a caller telephone 12, and after the processor 50 has determined the location of the caller telephone 12 (i.e. preferably by determining a revised estimated location from its direct latitude/longitude or its area code and prefix), the processor 50 needs only to access the appropriate grid. Assuming the grid is grid 412, the processor 50 needs only to retrieve the service or need providers from that grid in a lookup table like operation. The database 400 is actually a part of, or a subdata base of a database of all the SIC codes and all the geographic locations, preferably in the United States. This larger database is merely a huge lookup table which is located in the processor 50. Given the location (preferably area code and prefix later translated to North and East coordinates) of a caller telephone such as caller telephone 12 and the need (as shown by the SIC code) the processor can easily lookup the nearest need providers.

However, for the most part we will know the exact location of need providers without needing to use the area code and prefix to estimate. In addition, for the most part we will know the exact location of a caller without needing to use the area code and prefix technique. However, for need providers whose exact location is unknown the processor 50 will assign an estimated location plus an error value so that those need providers will be farther away generally than exactly known need providers.

The number of providers in each grid in FIG. 4 is shown by a number of "*" characters. For example, in grid 412 there is a single "*" character and therefore there is one need provider for that SIC code in that geographic regioin. In grid 410 there are four "*" characters indicating that there are four need providers for that SIC code in that geographic region. The telephone symbol in the grid 412 indicates that the telephone caller 12 is located in the grid 412.

Preferably, if less than 20 need providers are found in one grid, such as grid 412 then a second level search or lookup is done by processor 50, which is eight more grids surrounding the grid 412. The eight additional grids are shown in FIG. 4 with the label "2" in a circle. The search for need providers preferably stops when more than 20 providers are found or when the search level is too high so that the caller is too far away. For SIC codes available in limited numbers, each grid would be 4 by 4 miles instead of the normal 1 by 1 mile. Once twenty need providers are found then the distance from the need provider to the caller is computed.

Locations of need providers can alternatively or additionally be determined in the following manner:

The Post Office assigns each address a zip+4 code. Prior to the establishment of the Zip+4 system, the Post Office made the assignments for all addresses that were present at that time. A Zip+4 code is assigned to approximately 10 contiguous houses. Generally, all addresses that share the same Zip+4 code are within 1/10 mile of each other. The Post Office maintains the Zip+4 address Data base and each month they release the most current set of Zip+4 records. Zip+4 code that were assigned prior to the current month do not change, so the only new information are Zip+4 codes that were added during the prior month. A number of private companies obtain the monthly release of new Zip+4 codes. These companies utilize the Post Office information to generate enhanced information. Most notably, is the information that relates to the precise position of the center of the new Zip+4 codes. The precise position is expressed in terms of its latitude and longitude.

Companies develop this information in one of two ways:

a. map utilization

This technique involves the use of digitizer maps. Each new address is located on a map and its position is computed from the relative position of known streets. The actual position is determined by the proportioning of house numbers. This technique is called Geocoding. This process provides accurate results in most cases, however in some cases such as new construction, the process fails.

b. direct measurement

This technique involves having some person visit each new zip+4 code region and take a direct reading of its latitude and longitude. Direct latitude and longitude reading is done by the use of a GPS reading devise. This is the superior approach in that each and every Zip+4 code is tagged with an accurate latitude and longitude.

As a result of the above, some business and residential list providers now furnish the latitude and longitude for each entry on the list. At the present time approximately 70% of entries on a business/residential list contain latitude-longitude information. This latitude and longitude information can be used to determine the location of both need providers and callers.

Figure 5:
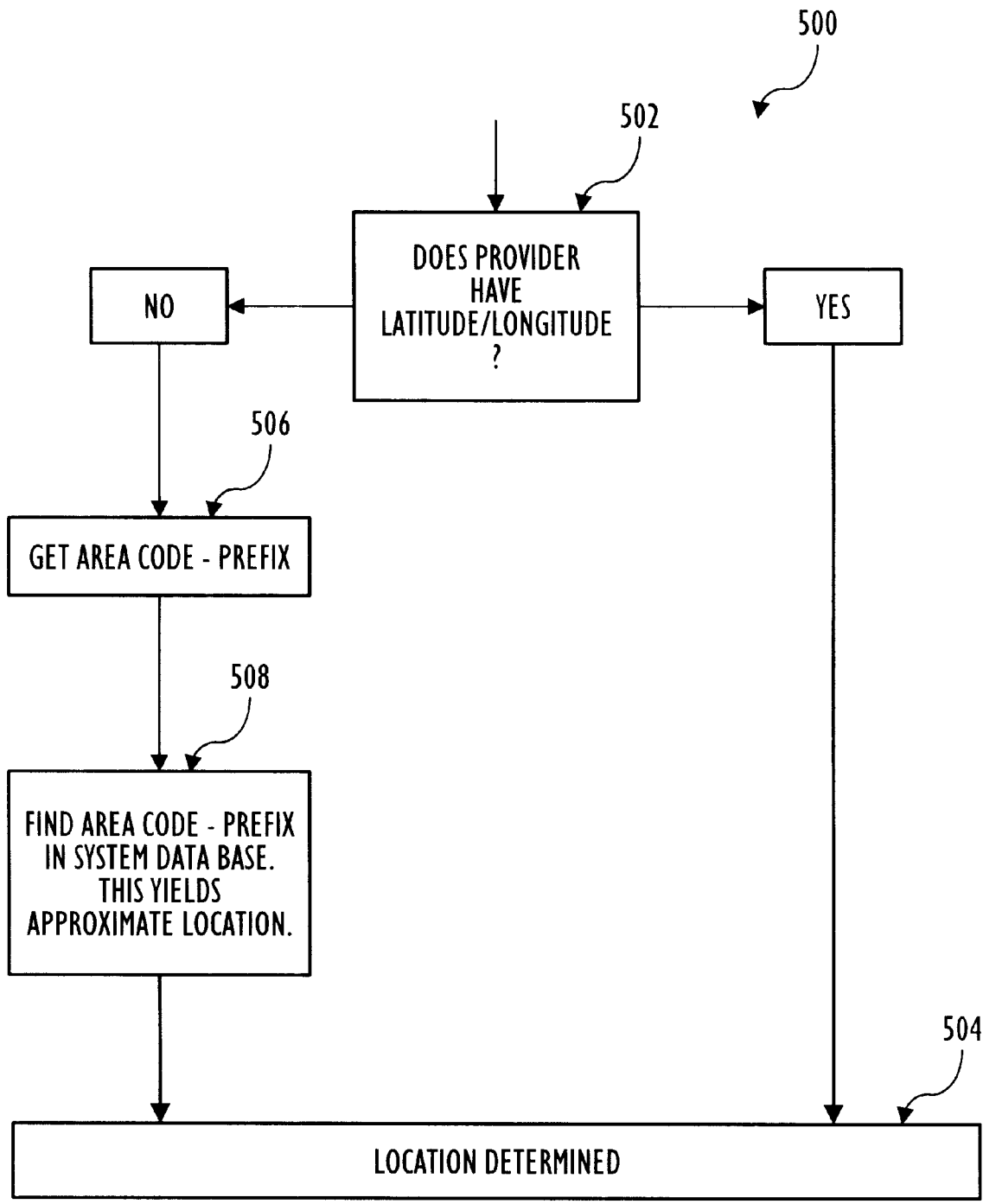
FIG. 5 shows a flowchart for a technique of determining the location of a need provider.

FIG. 5 shows a flow chart 500 of a method of determining the location of a provider of a need. At step 502 a processor such as processor 50 in FIG. 1, determines whether the need provider has a latitude and longitude, i.e. whether the processor 5.0 already knows what the latitude and longtidue is. If the answer is yes, the processor 50 proceeds to step 504. If the answer is no, the processor 50 proceeds to step 506, where it gets the area code and prefix of the need provider. Subsequently the processor 50 determines an approximate latitude longitude from the area code prefix at step 508 and location has been determined when step 504 is reached.

Figure 6:
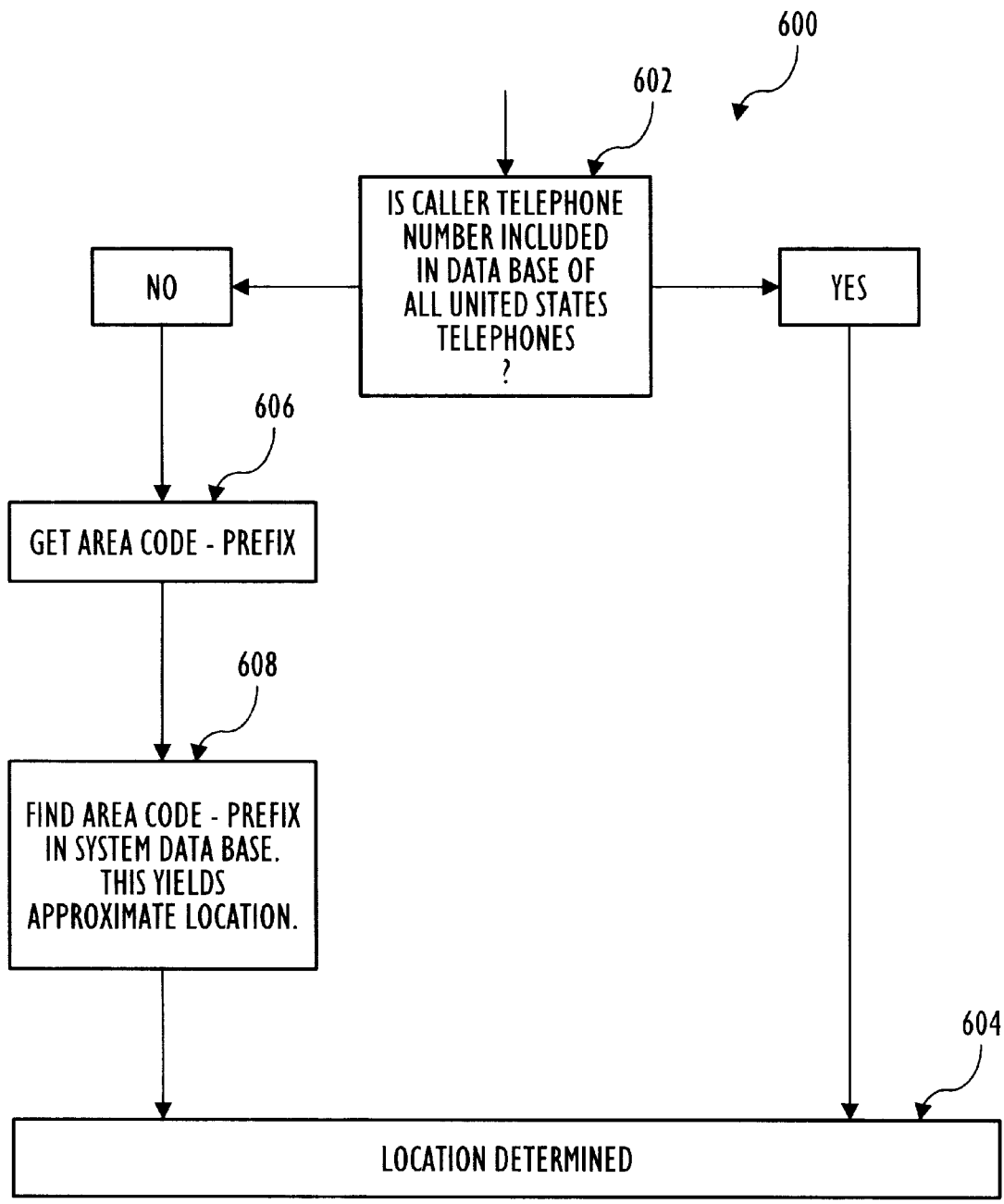
FIG. 6 shows a flowchart for a technique of determining the location of a caller telephone.

FIG. 6 shows a flow chart 600 of a method of determining the location of a caller telephone, such as caller telphone 12 shown in FIG. 1. At step 602, the processor 50 determines whether the caller's telephone number is included in the data base of all U.S. telephones which have latitude and longitude information. If the answer is yes, then the processor 50 knows the latitude and longitude and can access that information from its own memory or its own data base and the processor proceeds to step 604. If the answer is no, then the processor 50 uses the area code and prefix of the caller telephone at steps 606 and 608 to determine an approximate location of a caller telephone, such as caller telephone 12.

The processor 50 preferably has the following data bases in its memory which are used for accumulating need providers.

1. SIC data base:

This data base consists of over 10 million need providers broken down by SIC code. This data base includes latitude and longitude for 70% of the need providers.

2. SIC yields BRAND data:

The SIC data base is preferably searched to develop the BRAND data base. Each Brand category is preferably related to a collection of SIC codes. Each member of each SIC code is searched for each Brand name chosen for inclusion. In one embodiment the brands chosen for inclusion are those that are popularly known and have over 500 locations.

3. YELLOW:

This is a separate data base that provides detailed breakouts for both restaurants and doctors. Each restaurant is identified with the type of food service, such as French, Mexican, etc. Each doctor is identified with the type of practice he is in, such as cardiology, internal medicine, etc. This data base does not have latitude and longitude information for each entry. However, preferably in one embodiment, the latitude and longitude information is inserted by comparing telephone numbers with the SIC data base and using the latitude longitude from that data base.

4. NATIONAL 800:

Certain needs are not location sensitive. These needs often require the dialing of a national 800 number. Below are the categories included with this data base.

a. airlines b. major hotels c. car rental d trains.

These needs are met with in one embodiment by the processor 50 determining the proper 800 number to dial and automatically dialing that one number.

The processor 50 may find need providers centered around a location, different from that of the caller's telephone such as caller telephone 12. The caller can preferably be given the opportunity to enter a telephone number that is different from that of his own telephone. In this manner, the caller is empowered to reach need providers that are centered around any point in the United States. As an example of this application, consider the circumstance where you are going on a business trip and need to rent a car from a car rental agency that is close to the hotel you are staying at. Using the system, you would enter the area code prefix of the hotel and you will immediately be in voice contact with car rental agencies in the vicinity of your hotel.

In another embodiment for an additional use; Speed Dialing is provided by the processor 50. The technique is employed to request a specific type of need provider and could also be used to isolate a number or company from a large personal directory. For example the processor 50 in one embodiment may guide a user, such as one using caller telephone 12, to enter his personal telephone directory into the system, i.e. into the memory of the processor 50. Once done, an additional calling capability would be available which we call "speed dial". Now, instead of the user finding the number to be called from an independent source, he would simply key in some letters that spell the desired party's name, at a caller telephone, such as caller telephone 12, shown in FIG. 1. This embodiment is particularly useful when the caller telephone 12 is a payphone. The processor 50 would find the desired party's telephone number, and then immediately and automatically dial the party's telephone number. In the event of duplicates, the user would make a selection from a short menu.

In another embodiment of the present invention a simple telephone messaging system is provided. FIG. 7 shows the method of operation of this system called "telephone rendezvous" or "Two Way Voice Mail". A first person would dial a toll free telephone number, then type in a PIN number. The messaging system can be used by using pay telephone equipment. The underlying system feature is that each of two or more people individually use different public telephones to both leave a message and listen to a message.

The first person, from a caller telephone such as caller telephone 12 of FIG. 1, but which in this embodiment is preferably a payphone, would be able to listen to a message or put in his own message. A second person, such as from another caller telephone similar to caller telephone 12 but preferably from another location, which again is preferably a payphone, could call the same toll free telephone number afterwards (as the first person), and also type in the same PIN number (as the first person). The second person would be able to listen to the first person's message and then to record over the message. Preferably only one message would be left on the system, so that each party could get the latest status without listening to a plurality of older messages. The equipment needed in this embodiment is similar to FIG. 1, only a provider telephone 14 is not needed since the processor 50 does not connect a caller with a provider. Rather the processor 50 would provide the caller with the last message and allow the caller to record a message to be saved in the processor 50. Voice recording equipment would need to be provided in the processor 50.

Each person would have the option of recording or not recording a message.

An example of this embodiment is shown in FIG. 7. In step "A" the voice "bucket" starts out empty. In step "B" the first person leaves a message such as "I am going to be late for the meeting". At step "C" the second person calls and listens to the message. At step "D" the second person leaves a message, which preferably erases the first person's message. The second person's message could be for example: "The location of the meeting has been changed." At step "E" the first person hears the message left by the second caller. This messaging system can be used for the following instances:

A. When two or more people plan to rendezvous at an arbitrary destination. (restaurant, hotel, airport, etc.)
B. When two or more people attend a function together (trade show, state fair, etc. and get separated by accident, or plan to separate and meet at a specific place and time).
C. People participating in a sporting event such as a marathon, bike ride, etc. and get separated.
D. When a family goes on vacation to a foreign city and somehow lose one member.

The calls for the rendezvous messaging system shown by FIG. 7, are preferably made at a public pay telephone, and are answered by a computer, such as processor 50, which performs all the call management, voice storage, voice recording and voice playing. The system is particularly useful when each participating person is aware of the possiblity of a message being left, and has been instructed on how to receive and leave messages. One of the practical applications of this message system is when two or more people plan to rendezvous at a specific place and a specific time. In this circumstance, no person is available to be reached at his/her normal home/business. Each of the people involved would have to discuss this method of communicating in the event some one is unable to keep the appointment as planned.

The advantages of this messaging embodiment are that it is always available (since payphones can be used); no equipment, such as pagers or beepers, is required for the user (again since payphones can be used); preferably no coins or calling card is required (use of 800 number and PIN number); there is little to remember; it is very inexpensive; and can also work with a group of people.

I claim:

1. A system under the control of a processor which:
   receives a first location of a first telephone;
   receives a second location of a second telephone;
   receives a plurality of further locations of further telephones, the first and second locations and the plurality of further locations located in a region;
   receives an origin location;
   determines a first distance of the first telephone from the origin location;
   calculates a first estimated location of a third telephone in the region based on the second location and the plurality of further locations, without using the first location of the first telephone if the first distance of the first telephone from the origin location is greater than a threshold.

2. The system of claim 1 and further wherein the system:
   receives a plurality of locations of a plurality of providers;
   determines a first provider that is nearby to the first estimated location; and
   in response to a telephone call from a caller telephone located in the region calls a telephone of the first provider and places the caller telephone in communication with the telephone of the first provider.

3. The system of claim 2 and further wherein the system:
   determines a second provider that is nearby to the first estimated location; and
   in response to a signal calls a telephone of the second provider and places the caller telephone in communication with the telephone of the second provider.

4. The system of claim 3 and wherein the signal is a busy signal.

5. The system of claim 3 and wherein the signal is derived from an input from the caller telephone.

6. The system of claim 5 and wherein the signal is derived from a signal key typed into the caller telephone.

7. A system under the control of a processor which:
   receives through a telecommunications transmission, from a caller telecommunications device, a description of a general need;
   produces a plurality of choices of general needs based on the description and provides the plurality of choices of general needs to the caller telecommunications device by a telecommunications transmission; and
   receives from the caller telecommunications device through a telecommunications transmission, a selection of a first choice from the plurality of choices of general needs.

8. The system of claim 7 and further wherein the description of the general need is an oral description.

9. The system of claim 7 and further wherein the description of the general need is a series of telephone digits.

10. The system of claim 9 and further wherein the series of telephone digits forms a plurality of letters of a spoken language word.

11. The processor of claim 10 and further wherein in response to the selection of the first choice, the system calls a telecommunications device of the first choice and places the caller telecommunications device in communication with the telecommunications device of the first choice.

12. The system of claim 11 and wherein the information about the location of the first choice is recorded in a data base.

13. The system of claim 7 and wherein the general need is a product.

14. The system of claim 7 and wherein the general need is a service.

15. The system of claim 7, and further wherein in response to the selection of the first choice, the system sequentially calls, under the control of a user of the caller telecommunications device, a plurality of telecommunications devices of the first choice and places the caller telecommunications device in communication with called ones of said plurality of telecommunications devices of the first choice.

16. A system under the control of a processor which:
receives through a telecommunications transmission, from a caller telecommunications device, a description of a general need;
produces a plurality of choices of general needs based on the description and provides the plurality of choices of general needs to the caller telecommunications device by a telecommunications transmission;
receives from the caller telecommunications device through a telecommunications transmission, a selection of a first choice from the plurality of choices of general needs; and
produces a nearby provider of said first choice by determining the location of the caller telecommunications device.

17. The system of claim 16 and further wherein the system:
provides a list of a plurality of nearby providers which provide a need having a code; and
translates the description of the general need provided by the caller communication device into the code.

18. The system of claim 17 and further wherein:
the code is an SIC Standard Industrial Classification code.

19. The system of claim 16 and further wherein the system under the control of the processor:
generates a list of a plurality of nearby providers based upon the determined location of the caller telecommunications device.

20. A system under the control of a processor which:
determines a revised estimated location of a third telephone based on a second location, a plurality of further locations and a first location of a first telephone in a region;
receives the second location of a second telephone in the region;
produces a first estimated location of the third telephone in the region based on the first and second locations;
receives the plurality of further locations of a plurality of further telephones, the plurality of further locations located in the region;
produces the first estimated location of the third telephone in the region based on the first and second locations and the plurality of further locations;
determines a first distance of the first telephone from the first estimated location; and
determines a revised estimated location of the third telephone based on the second location and the plurality of further locations, without using the first location of the first telephone if the first distance is greater than a threshold.

21. A location determining method, comprising the steps of:
receiving a first location of a first telephone;
receiving a second location of a second telephone;
receiving a plurality of further locations of further telephones, the first and second locations and the plurality of further locations located in a region;
receiving an origin location;
determining a first distance of the first telephone from the origin location;
calculating a first estimated location of a third telephone in the region based on the second location and the plurality of further locations, without using the first location of the first telephone if the first distance of the first telephone from the origin location is greater than a threshold.

22. The method of claim 21, further comprising the steps of:
receiving a plurality of locations of a plurality of providers;
determining a first provider that is nearby to the first estimated location; and
calling a telephone of the first provider and placing the caller telephone in communication with the telephone of the first provider in response to a telephone call from a caller telephone located in the region.

23. The method of claim 22, further comprising the steps of:
determining a second provider that is nearby to the first estimated location; and
calling a telephone of the second provider and placing the caller telephone in communication with the telephone of the second provider in response to a signal.

24. The method of claim 23, further comprising the step of deriving the signal from a busy signal.

25. The method of claim 23, further comprising the step of deriving the signal from an input from the caller telephone.

26. The method of claim 25, further comprising the step of obtaining the signal from a signal key typed into the caller telephone.

27. A method of selecting a need using a telecommunications device, comprising the steps of:
receiving through a telecommunications transmission, from a caller telephone device, a description of a general need;
producing a plurality of choices of general needs based on the description and providing the plurality of choices of general needs to the caller telecommunications device by a telecommunications transmission; and
accepting from the caller telecommunications device through a telecommunications transmission, a selection of a first choice from the plurality of choices of general needs.

28. The method of claim 27, wherein said step of receiving comprises the step of receiving an oral description of a general need.

29. The method of claim 27, wherein said step of receiving comprises the step of receiving a series of telephone digits.

30. The method of claim 29, wherein the series of telephone digits for a plurality of letters of a spoken language word.

31. The method of claim 30, further comprising the steps of calling a telecommunications device of the first choice and placing the caller telecommunications device in communication with the telecommunications device of the first choice in response to the selection of the first choice.

32. The method of claim 31, comprising the step of recording in a data base the information about the location of the first choice.

33. The method of claim 27, wherein the general need is a product.

34. The method of claim 27, wherein the general need is a service.

35. A method of identifying a nearby provider of a general need, comprising the steps of:
receiving through a telecommunications transmission, from a caller telecommunications device, a description of a general need;
producing a plurality of choices of general needs based on the description and providing the plurality of choices of general needs to the caller telecommunications device by a telecommunications transmission;
receiving from the caller telecommunications device through a telecommunications transmission, a selection of a first choice from the plurality of choices of general needs; and
producing a nearby provider of said first choice by determining the location of the caller telecommunications device.

36. The method of claim 35, further comprising the step of:
providing a list of a plurality of nearby providers which provide a need having a code; and
translating the description of the general need provided by the caller communication device into the code.

37. The method of claim 35, further comprising the step of generating a list of a plurality of nearby providers based upon the determined location of the caller telecommunications device.

38. A location determining method, comprising the step of:
determining a revised estimated location of a third telephone based on a second location, a plurality of further locations and a first location of a first telephone in a region;
receiving the second location of a second telephone in the region;
producing a first estimated location of the third telephone in the region based on the first and second locations;
receiving the plurality of further locations of the plurality of further telephones, the plurality of further locations located in the region;
producing the first estimated location of the third telephone in the region based on the first and second locations and the plurality of further locations;
determining a first distance of the first telephone from the first estimated location; and
determining the revised estimated location of the third telephone based on the second location and the plurality of further locations, without using the first location of the first telephone if the first distance is greater than a threshold.

* * * * *